(12) United States Patent
Aizawa

(10) Patent No.: US 7,159,465 B2
(45) Date of Patent: Jan. 9, 2007

(54) FLUORORESIN THIN FILM DIAPHRAGM PRESSURE SENSOR AND METHOD OF FABRICATING THE SAME

(75) Inventor: Mitsuyoshi Aizawa, Tokyo (JP)

(73) Assignee: Tem-Tech Lab. Co., Ltd., Tokyo (JP)

( * ) Notice: Subject to any disclaimer, the term of this patent is extended or adjusted under 35 U.S.C. 154(b) by 0 days.

(21) Appl. No.: 11/243,978

(22) Filed: Oct. 6, 2005

(65) Prior Publication Data

US 2006/0075822 A1  Apr. 13, 2006

(30) Foreign Application Priority Data

Oct. 7, 2004  (JP)  ............................. 2004-294841

(51) Int. Cl.
*G01L 7/08* (2006.01)

(52) U.S. Cl. ...................... 73/715; 73/718; 361/283.1; 361/283.4

(58) Field of Classification Search .......... 73/700–756; 361/283.1–283.4
See application file for complete search history.

(56) References Cited

U.S. PATENT DOCUMENTS

| | | | | |
|---|---|---|---|---|
| 5,097,841 | A * | 3/1992 | Moriuchi et al. ........... | 600/488 |
| 6,125,189 | A * | 9/2000 | Yasuno et al. .............. | 381/111 |
| 6,640,639 | B1 * | 11/2003 | Okawa ........................ | 73/706 |

FOREIGN PATENT DOCUMENTS

JP   2006133104 A  *  5/2006

OTHER PUBLICATIONS

Akihiro Oshima, et al., "*Radiation Induced Crosslinking of Polytetrafluoroethylene*", Radiat. Phys. Chem., vol. 45, pp. 269-273 (1995).

* cited by examiner

*Primary Examiner*—Michael Cygan
*Assistant Examiner*—Jermaine Jenkins
(74) *Attorney, Agent, or Firm*—Wenderoth, Lind & Ponack, L.L.P.

(57) ABSTRACT

The present invention provides a highly corrosion-resistant diaphragm pressure sensor capable of obviating the effects of temperature drift that arises when a pressure-travel coefficient changes with temperature of a fluid whose pressure is sensed, and a method of manufacturing the same. A fluororesin thin film diaphragm pressure sensor comprises a pressure sensing element (10, 20) having a pressure receiving part with a deposition electrode formed on each of the opposing faces of sapphire or alumina ceramic diaphragms which are arranged in opposing relation, and a welding portion (10A, 20A) on a part of each of the surfaces of the diaphragms; and a fluororesin base (41, 61) for securing the pressure sensing element at the welding portion of the pressure sensing element. The pressure sensing element is coated with a fluororesin thin film having a cross-linked structure, and the pressure sensing element and the fluororesin base are welded together via the fluororesin thin film having a cross-linked structure.

5 Claims, 6 Drawing Sheets

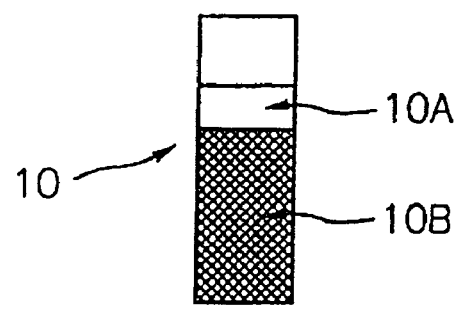
Fig. 4A
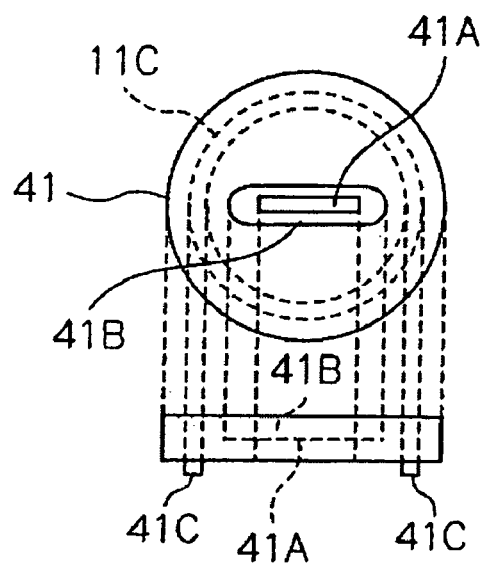
Fig. 4B
Fig. 4C
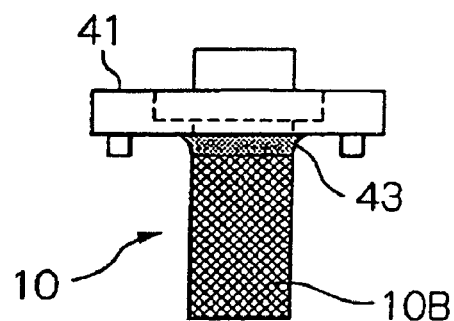
Fig. 4D
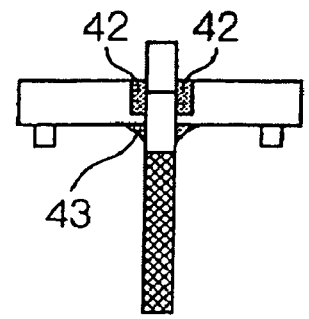
Fig. 4E

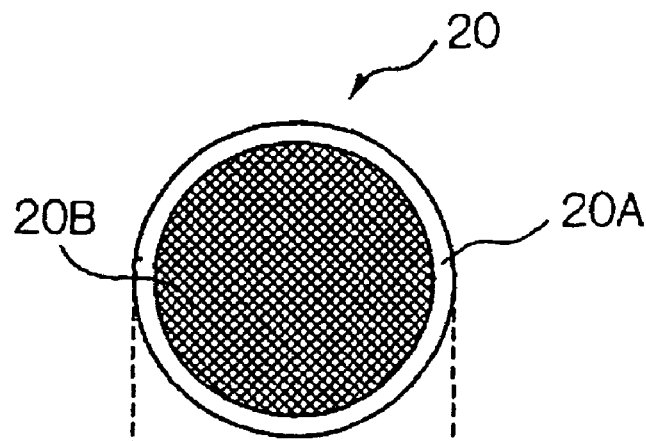
Fig. 6A
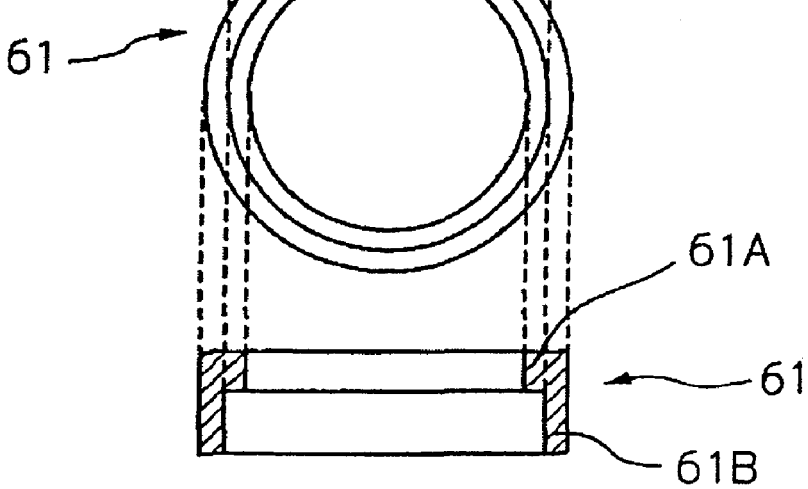
Fig. 6B
Fig. 6C
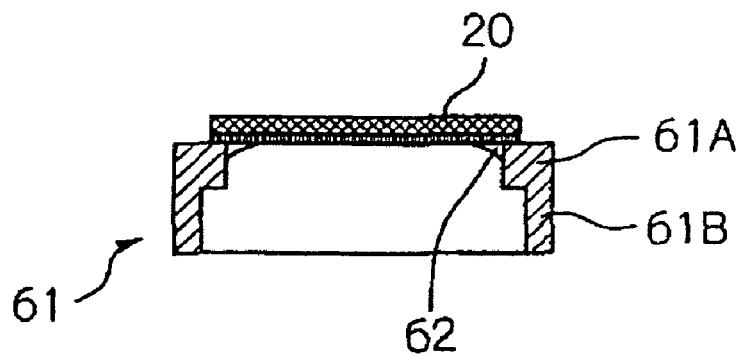
Fig. 6D

FLUORORESIN THIN FILM DIAPHRAGM PRESSURE SENSOR AND METHOD OF FABRICATING THE SAME

BACKGROUND OF THE INVENTION

The present invention is directed to a diaphragm pressure sensor and a method of fabricating the same, and in particular to a diaphragm pressure sensor for sensing a fluid pressure in, for example, a container for chemicals, a pipe for chemicals or the like, and a method of fabricating the same.

Conventional pressure sensors for sensing a fluid pressure in a container for chemicals, a pipe for chemicals or the like, are generally provided with a diaphragm which acts as a pressure-sensing means, whereby deflection of the diaphragm in response to an applied pressure is translated into an electric signal, to thereby sense a pressure.

Japanese Patent Application No. 2002-130442 discloses an example of such a diaphragm pressure sensor in the invention titled "Electrical capacitance diaphragm pressure sensor".

Such a diaphragm pressure sensor comprises, for example, :a pressure-sensing element provided with a pressure receiving part including strip-shaped or rectangular flat plate-shaped diaphragms provided in opposing relation, and deposition electrodes formed on opposing surfaces of the diaphragms; a housing element for enclosing the pressure receiving part of the pressure-sensing element, the housing element being made of a material which is resistant to corrosion by a fluid whose pressure is to be detected by the sensor; and an electronic circuit for detecting deflection of the diaphragms.

Such a diaphragm pressure sensor as described above is constituted such that when immersing a housing element in a fluid whose pressure is to be measured, the fluid pressure acts on a pressure receiving part, and any resulting variations in distance between opposing diaphragms cause a change in capacitance.

In a conventional diaphragm pressure sensor such as that described above, a pressure transfer coefficient varies according to a temperature of a fluid whose pressure is to be measured, and instability such as temperature drift and the like is thereby caused, and as a result, measurement accuracy is significantly compromised. It is known that a leading cause of temperature drift in a diaphragm pressure sensor is a thermal expansion/contraction coefficient of a diaphragm material.

With a view to preventing temperature drift from disadvantageously affecting measurement by a diaphragm pressure sensor, a conventional diaphragm pressure sensor, especially a metal diaphragm pressure sensor, employs a temperature compensation circuit in a pressure sensing circuit for sensing a pressure deflection of a diaphragm, or disposes a temperature sensor in a diaphragm to measure a temperature of the diaphragm and provide a compensation electric signal commensurate with the thus measured temperature to a pressure sensing circuit, to thereby compensate for temperature drift, that is, a thermal expansion/contraction coefficient of a diaphragm material in accordance with a temperature.

As a pressure-sensing element, a sapphire diaphragm pressure sensor in which a diaphragm is made of a sapphire plate, and a ceramic diaphragm pressure sensor in which a diaphragm is made of an alumina ceramic plate, are also known. Since sapphire and alumina ceramic have a considerably smaller thermal expansion coefficient compared to metallic materials, they can compensate for temperature drift effectively. However, both a sapphire, which is a crystallization of alumina, and an alumina ceramic, which is made of a sintered body of alumina, gradually erode when they come into contact with a strong acid fluid such as a highly concentrated fluoric acid solution or nitrate solution, and therefore, they are not desirable in terms of corrosion resistance.

Following are a few conventional ways to impart corrosion resistance to a sapphire diaphragm, a ceramic diaphragm or the like.

(1) A fluororesin is applied on the surface of a diaphragm to form a fluororesin coating and thereby improve corrosion resistance.

(2) A relatively thick diaphragm of fluororesin is formed, upon which another diaphragm made of a sapphire plate, a ceramic plate or the like is overlaid to fabricate a double diaphragm and thereby improve corrosion resistance.

However, improvement measures such as those described above still cannot solve the following problems:

(1) A fluororesin per se significantly expands and shrinks with temperature, which causes stress strain on a diaphragm and temperature drift in a diaphragm pressure sensor.

(2) When a fluororesin is simply applied to the surface of a diaphragm to form a fluororesin coating, such a coating cannot be tightly secured to the diaphragm, and easily peels.

(3) As a fluororesin per se is non-adherent, when preparing a double diaphragm, an adhesive containing an amine or the like is employed to bond a fluororesin diaphragm to a diaphragm made of a sapphire plate, a ceramic plate or the like. However, a relatively great thickness of a fluororesin diaphragm, and lack of uniform thickness of an adhesive over a diaphragm, sometimes prevents a pressure from being thoroughly communicated between the fluororesin diaphragm and the diaphragm made of a sapphire plate, a ceramic plate or the like.

(4) In a double diaphragm, a relatively thick fluororesin diaphragm allows temperature drift to become great due to thermal expansion/contraction of the fluororesin diaphragm per se. Therefore, a pressure sensor employing such a double diaphragm can be used only under certain temperature conditions.

SUMMARY OF THE INVENTION

The object of the present invention is to provide a diaphragm pressure sensor employing a fluororesin to have both excellent corrosion resistance to a strong acid or alkaline liquid and mechanical strength, and a method of fabricating the same.

According to the present invention, a fluororesin thin film diaphragm pressure sensor comprises: a pressure-sensing element having a pressure-receiving part with a deposition electrode being formed on each of the opposing surfaces of sapphire or alumina ceramic diaphragms which are disposed in opposing relation, and a welding part on a portion of the surface of each of the diaphragms; and a fluororesin base for securing the pressure-sensing element at the welding part of the pressure-sensing element.

The pressure-sensing element is coated with a fluororesin thin film having a crosslinked structure and is welded to the fluororesin base via the fluororesin thin film having a crosslinked structure.

The sensor is configured such that a medium's pressure to be measured is communicated to the pressure-receiving part and any resulting variations in a distance between the deposition electrodes formed on the opposing surfaces of the diaphragms disposed in opposing relation cause a change in capacitance.

According to the present invention, a method of fabricating a fluororesin thin film diaphragm pressure sensor for sensing a fluid pressure comprises the steps of:

forming a pressure-sensing element having a pressure-receiving part with a deposition electrode being formed on each of the opposing surfaces of sapphire or alumina ceramic diaphragms which are provided in opposing relation, and a welding part constituting a portion of the surface of each of the diaphragms;

forming a fluororesin thin film on the pressure-sensing element;

holding the fluororesin thin film formed on the pressure-sensing element at high temperatures, and applying electron beams to the fluororesin thin film, thereby changing the molecular structure of the fluororesin of the fluororesin thin film to a crosslinked structure;

preparing a fluororesin base for securing the pressure-sensing element; and securing the pressure-sensing element to the fluororesin base at the welding part of the pressure-sensing element via the fluororesin thin film having a crosslinked structure formed on the pressure-sensing element.

According to the present invention, a pressure-sensing element of a diaphragm pressure sensor is made of a fluororesin thin film having a crosslinked structure in which molecules cross-link to form a three-dimensional structure. Therefore, the present invention can provide a diaphragm pressure sensor having improved mechanical characteristics such as toughness, creep resistance or the like without sacrificing inherent strong points of a fluororesin such as lubricity, heat resistance, chemical resistance or the like.

According to the present invention, a fluororesin thin film having a crosslinked structure, which forms a pressure-sensing element of a diaphragm pressure sensor, can be tightly adhered to the surface of a sapphire or ceramic diaphragm or a metal surface as set forth above. Therefore, even though a fluororesin thin film formed on the surface of a sapphire or ceramic is as thin as, for example, several dozen microns, a sensor can still possess sufficient mechanical strength and thus, the present invention can provide a diaphragm pressure sensor having an excellent measurement accuracy while maintaining inherent distortion characteristics of a sapphire or ceramic diaphragm.

As described above, a fluororesin thin film having a crosslinked structure can be tightly adhered to the surface of a sapphire or ceramic diaphragm. Therefore, unlike a prior art in which a fluororesin is bonded to the surface of a sapphire or ceramic by an adhesive for fluororesin or the like with a view to improving corrosion resistance, the present invention does not employ an adhesive for fluororesin or the like as a pressure receiving transmitter. Thus, the present invention can provide a highly accurate diaphragm pressure sensor whose measurement accuracy does not deteriorate due to temperature drift attributable to property modification of an adhesive that occurs with temperature variations.

Still further, a pressure-sensing element of a diaphragm pressure sensor of the present invention is made of a fluororesin thin film having a crosslinked structure and a base for supporting the pressure-sensing element is also produced from a fluororesin; further, an outer cylinder for guiding a fluid whose pressure is to be measured may be made of a fluororesin. Thus, a diaphragm pressure sensor of the present invention can be entirely made of a fluororesin.

As a result, the present invention can provide a diaphragm pressure sensor having excellent corrosion resistance and mechanical strength.

BRIEF DESCRIPTION OF THE DRAWINGS

FIGS. 3A–3E describe a basic process for forming a fluororesin thin film portion respectively on a strip-shaped pressure-sensing element and a flat plate pressure-sensing element.

FIGS. 4A–4E illustrate a strip-shaped pressure-sensing element constituting a main portion of a diaphragm pressure sensor of the present invention and a fluororesin base for securing the element and also describe a basic process for manufacturing the same.

FIGS. 6A–6D illustrate a flat plate pressure-sensing element constituting a main portion of a diaphragm pressure sensor of the present invention and a fluororesin base for securing the element and also describe a basic process for manufacturing the same.

DETAILED DESCRIPTION OF THE INVENTION

Figure 1:
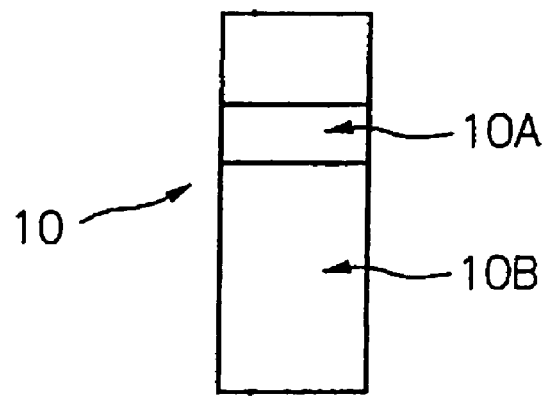
FIG. 1 illustrates a strip-shaped pressure-sensing element constituting a main portion of a diaphragm pressure sensor of the present invention and also describes a basic process for manufacturing the same.
Figure 2:
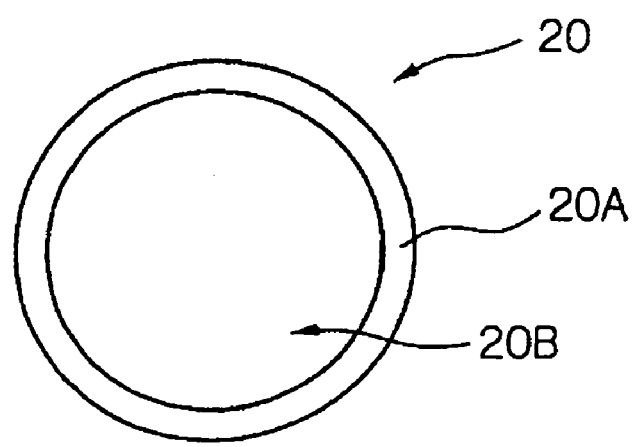
FIG. 2 illustrates a flat plate pressure-sensing element constituting a main portion of a diaphragm pressure sensor of the present invention.

FIGS. 1 and 2 illustrate a pressure-sensing element constituting a main portion of a diaphragm pressure sensor. More specifically, FIG. 1 is an illustration of strip-shaped pressure-sensing element 10 employing a sapphire plate or ceramic plate for a diaphragm and, as is described later, welding portion 10A and fluororesin thin film portion 10B are formed on the pressure-sensing element 10. Similarly, FIG. 2 is an illustration of flat-plate pressure-sensing element 20 employing a sapphire plate or ceramic plate for a diaphragm, and welding portion 20A and fluororesin thin film portion 20B are formed on the pressure-sensing element 20.

Although FIG. 1 portrays pressure-sensing element 10 simply as a strip-shaped member and, for the sake of simplicity, does not show its details, the element actually consists of two strip-shaped sapphire or alumina ceramic diaphragms arranged in opposing relation with a spacer positioned to lie between them, and deposition electrodes formed on opposing surfaces of the diaphragms, and the two strip-shaped diaphragms are assembled in an integral fashion to constitute a single unit. The opposing deposition electrodes are respectively connected via a lead wire to an electrode output terminal formed at the end of the pressure-sensing element 10 to output a detected signal.

Similarly, although FIG. 2 portrays pressure-sensing element 20 simply as a circular flat plate element and, for the sake of simplicity, does not show its details, it actually consists of two flat plate sapphire or alumina ceramic diaphragms arranged in opposing relation with a spacer positioned to lie between them, the diaphragms having electrodes formed on their opposing surfaces. The two flat plate sapphire or alumina ceramic diaphragms are assembled in an integral fashion to constitute a single unit. The opposing deposition electrodes are respectively connected via a lead wire to an electrode output terminal formed on a part of the pressure-sensing element 20 to output a detected signal.

Figure 3E:
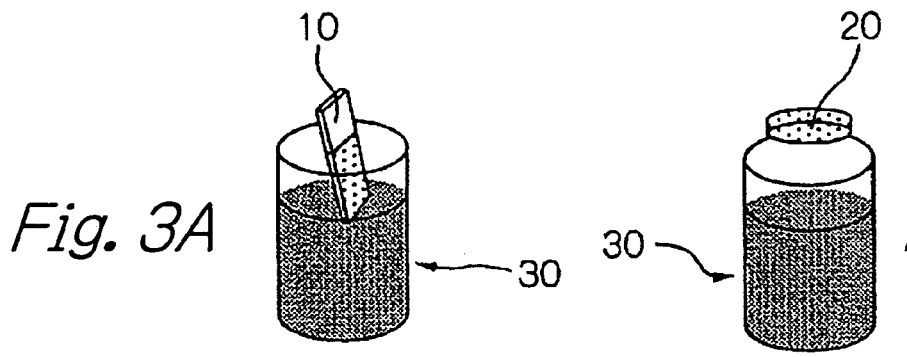
Figure 3E:
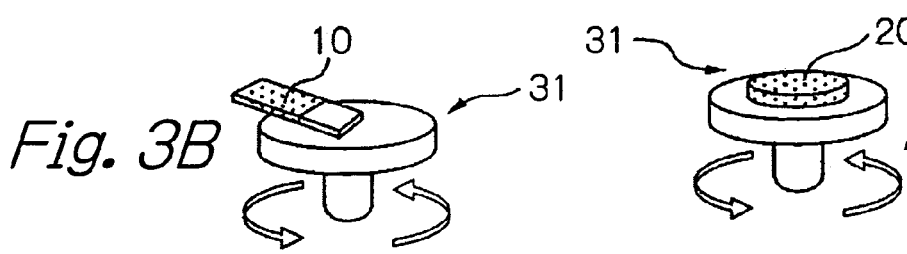
Figure 3E:
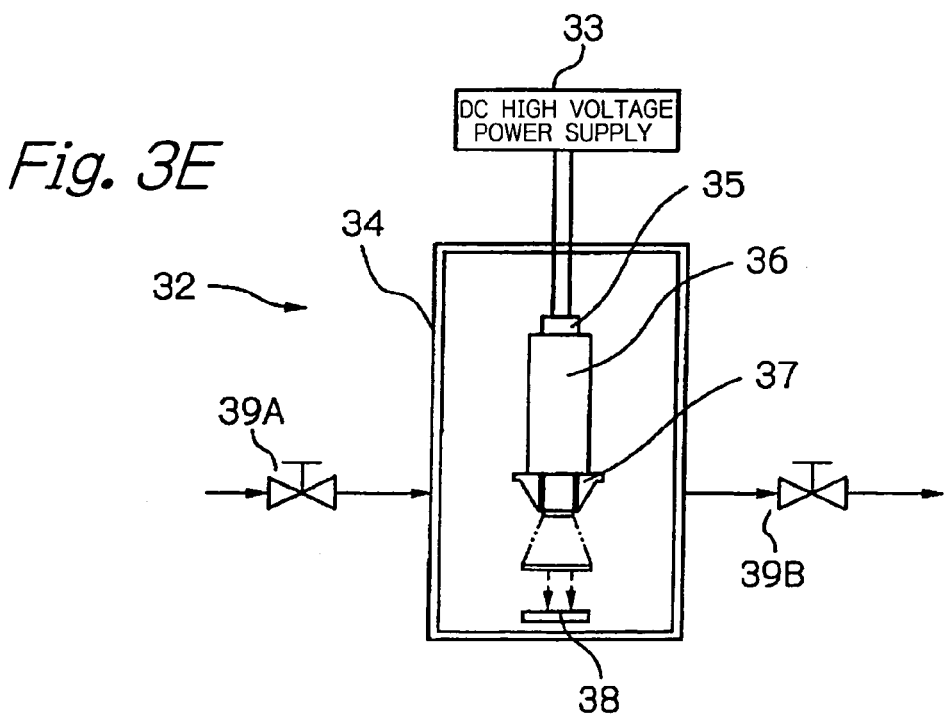

FIG. 3 schematically describes a process for forming the fluororesin thin film 10B and fluororesin thin film 20B on the strip-shaped pressure-sensing element 10 and flat plate pressure-sensing element 20 respectively.

As is illustrated in FIGS. 3A and 3B, a fluororesin PTFE (Polytetrafluoroethylene) solution and a PFA (registered trademark: Tetrafluoroethylene Perfluoroalkoxy vinyl ether copolymer) solution are mixed in a 1:1 ratio and emulsified. It is known empirically that by mixing the aforementioned solutions in a 1:1 ratio, stiffness properties of fluororesin PTFE and thermal solubility characteristics of PFA work effectively for adhesive bonding. Next, the strip-shaped pressure-sensing element 10 and flat-plate pressure-sensing element 20 are immersed in a fluororesin solution to coat the elements with fluororesin and form the fluororesin thin film portion 10B on the strip-shaped pressure-sensing element 10 and the fluororesin thin film portion 20B on the flat plate pressure-sensing element 20 respectively. Further, by rotating the pressure-sensing element 10 (20) coated with a fluororesin by a thin film forming instrument, for example, on spin coater 31 that rotates at high speeds, a fluororesin thin film is formed on the surface of the diaphragm, and the thus formed film is leveled. To attain a desired thickness of a fluororesin thin film on the surface of a diaphragm, the above-described procedure is repeated as needed.

Next, as is illustrated in FIG. 3E, the pressure-sensing element 10, 20 on which a thin film of a desired uniform thickness is formed is processed by electron beam irradiation system 32. As is already well known in the technical field, the electron beam irradiation system 32 comprises DC high voltage power supply 33, and electron beam emission cathode 35, electron beam accelerator 36, scanning deflection coil 37 and irradiation base 38 which are housed in closed vessel 34.

Hereunder, it will be described more specifically how the electron beam irradiation system 32 processes a fluororesin thin film.

First, the pressure-sensing element 10 (20) on which a fluororesin thin film is formed is placed on the irradiation base 38, and the closed vessel 34 is filled with an inactive gas such as an argon gas, nitrogen gas or the like via inlet valve 39A and further, the interior of the closed vessel 34 is heated at elevated temperatures of 330° C. ~390° C., which correspond to a melting point of a fluororesin until distribution of temperature becomes uniform throughout the pressure sensing element 10 (20).

Next, an electron beam is applied to the fluororesin thin film on the pressure-sensing element 10 (20). More specifically, an electron beam excited by the DC high voltage power supply 33 is emitted from the electron beam emission cathode 35 and accelerated by the electron beam accelerator 36. The scanning deflection coil 37 controls the direction of the electron beam whereby the fluororesin thin film on the pressure-sensing element 10 (20) is uniformly irradiated with the electron beam. The pressure-sensing element 10 (20) may be moved by an adequate instrument equipped with a rolling mechanism in the closed vessel 34 (not indicated in the drawing) so that electron beam can be applied both to the top and the bottom of the element 10 (20).

Upon application of the electron beam to the fluororesin thin film on the pressure-sensing element 10 (20), the temperature inside the closed vessel 34 is gradually reduced to room temperature, and the inactive gas in the closed vessel 34 is released through exhaust valve 39B. Subsequently, the pressure-sensing element 10 (20) whose fluororesin thin film was processed with electron beam (radiation) is taken out of the closed vessel 34.

When an electron beam is applied to fluororesin held at high temperatures, the molecular structure of the fluororesin changes to a covalent linkage in which the molecules cross-link to form a three-dimensional structure. Such a structure is known as a crosslinked structure of fluororesin and the molecular structural change as described above is called a crosslinking reaction. A crosslinked structure of fluororesin advantageously eliminates the use of an adhesive, improves the adhesion of a fluororesin thin film to the surface of a sapphire or alumina ceramic diaphragm and enhances abrasive resistance, stiffness and mechanical strength of the surface of a fluororesin thin film.

A fluororesin thin film is a normally white and opaque crystalline thin film. When it is kept under high temperature conditions and subjected to electron beam processing, so that it is modified to have a crosslinked structure, it loses its crystal structure and becomes colorless and transparent, by which it can be confirmed that the electron beam processing is complete.

FIG. 4 illustrates a basic process for manufacturing a diaphragm pressure sensor by employing the strip-shaped pressure-sensing element 10 (FIG. 4A) whose fluororesin thin film has been held at high temperatures and further subjected to electron beam processing as described above.

FIG. 4B is a plan view of fluororesin base 41 for securing a diaphragm, whereas FIG. 4C is a section view of the midsection of the same. As indicated in the drawings, the fluororesin base 41 has in the center, rectangular slit 41A, through which the strip-shaped pressure-sensing element 10 is inserted, and adhering portion 41B is formed in an approximately rectangular groove that surrounds the slit 41A, to secure the pressure-sensing element 10. Further, ring-shaped projection 41C for securing a metal outer cylinder (FIG. 6, 60) which houses the fluororesin thin film portion 10B constituting a pressure-receiving portion of the pressure-sensing element 10, is provided on the underside of the fluororesin base 41.

FIG. 4D is an assembly drawing of the strip-shaped pressure-sensing element 10 and the fluororesin base 41 whereas FIG. 4E is a lateral cross section of the same. The pressure-sensing element 10 is inserted into the slit 41A of the fluororesin base 41 to the extent that the welding portion 10A of the element 10 aligns with the slit 41A on the base 41, and fluororesin welding agents 42 and 43 are injected into the adhering portion 41B, whereby the pressure-sensing element 10 having the fluororesin thin film portion 10B of a crosslinked structure is secured to the fluororesin base 41 by means of high temperature welding to define a pressure-receiving portion of the pressure-sensing element 10.

Figure 5:
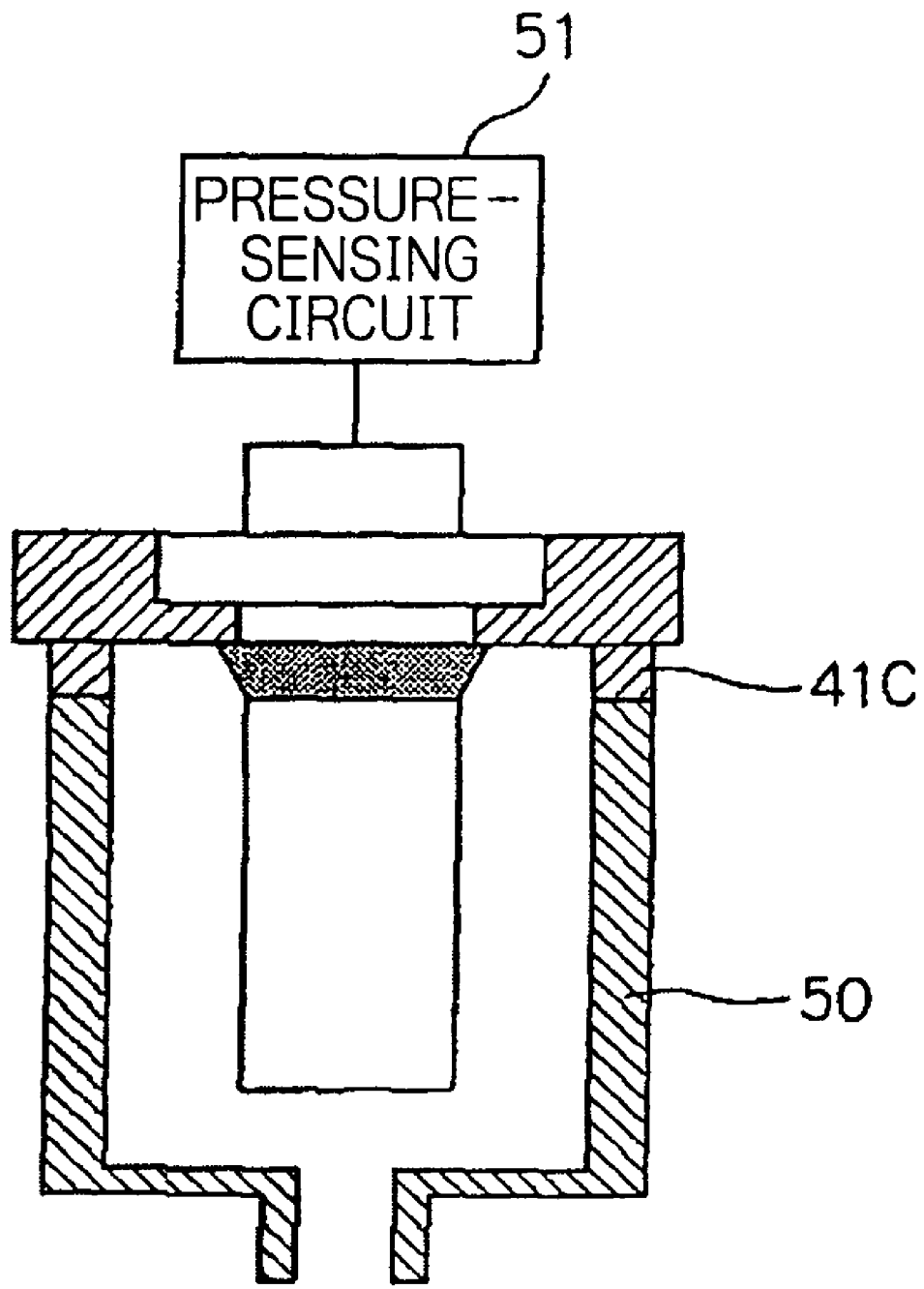
FIG. 5 schematically illustrates the diaphragm pressure sensor indicated in FIG. 4 in finished form for practical use.

As illustrated in FIG. 5, the strip-shaped diaphragm pressure sensor indicated in FIG. 4 may be installed in, for example, a pipe for chemicals (not indicated in the drawing), in which case the fluororesin outer cylinder 50 together with the pressure-receiving portion of the pressure-sensing element 10 is immersed directly in a chemical solution and a pressure of the chemical solution drawn into the cylinder 50 is measured. In other words, a measured pressure of a chemical solution is transferred to the pressure receiving portion of the pressure-sensing element 10 and a change in capacitance caused by variations in a distance between the diaphragms provided in opposing relation is output as a detected signal from the pressure-sensing circuit 51. Thus, any part of the diaphragm pressure sensor, which comes into contact with a solution whose pressure is measured, may be produced from fluororesin. Further, if a metal outer cylinder is employed in place of the fluororesin outer cylinder 50, the parts of the sensor that come into contact with a solution can still be made of fluororesin simply by coating the metal cylinder with a fluororesin film.

FIG. 6 illustrates a basic process for manufacturing a diaphragm pressure sensor by using the circular flat plate pressure sensing element 20 (FIG. 6A) whose fluororesin thin film has been held at high temperatures and subjected to electron beam processing.

FIG. 6B is a plan view of the ring-shaped fluororesin base 61 for securing a diaphragm whereas FIG. 6C is a section view of the midsection of the same. As indicated in the drawing, first ring portion 61A and second ring portion 61B are formed on the ring-shaped fluororesin base 61 in such a manner that the internal diameter of the second ring portion 61B is greater than that of the first ring portion 61A. Next, as indicated in FIG. 6D, the pressure-sensing element 20 is mounted on the first ring-shaped portion 61A, and the welding portion 20A formed on the periphery of the pressure-sensing element 20 is secured to the top part of the ring-shaped portion 61A by means of high temperature welding, using the fluororesin welding agent 62 to thereby define a pressure-receiving portion of the pressure-sensing element 20.

Figure 7:
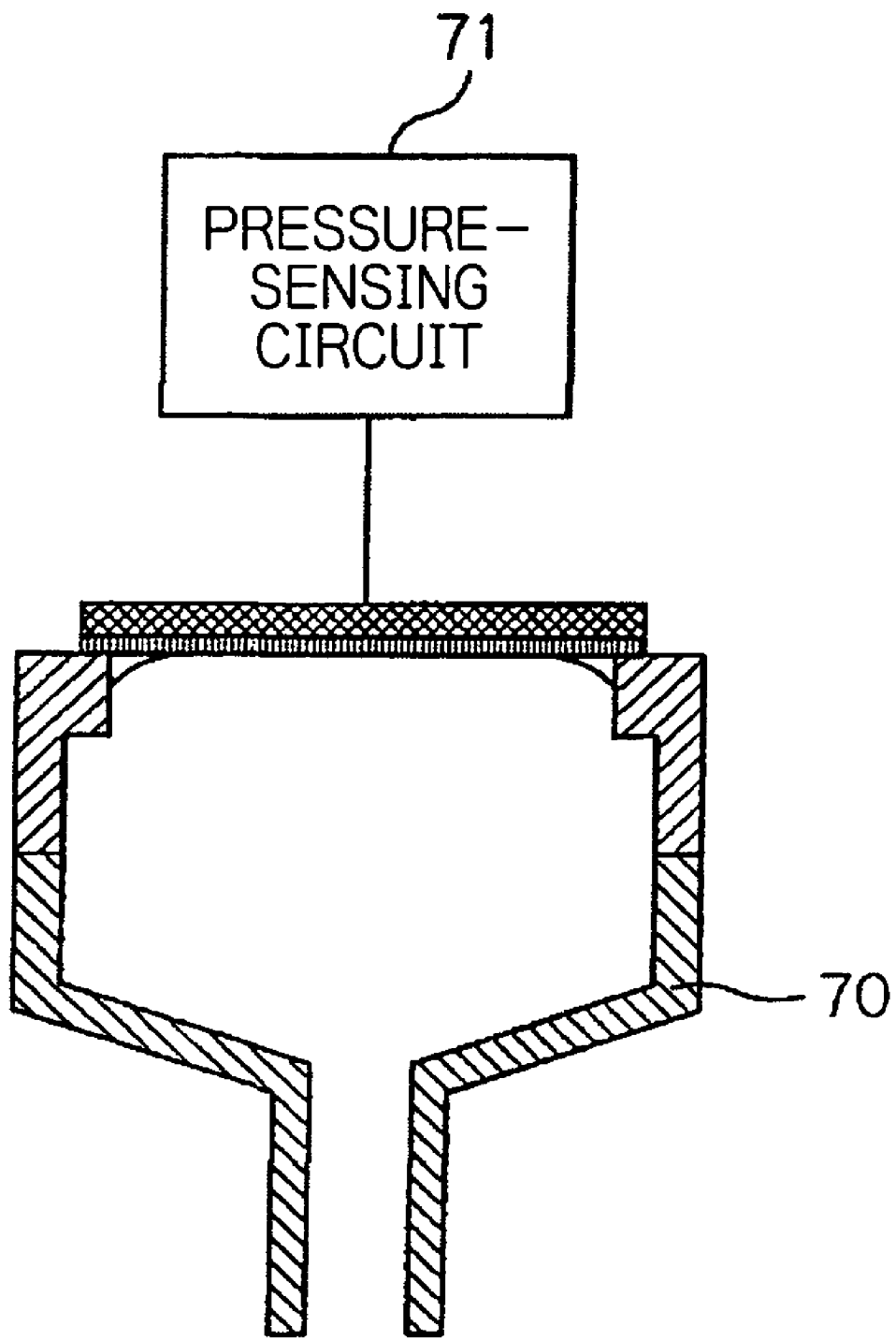
FIG. 7 schematically illustrates the diaphragm pressure sensor indicated in FIG. 6 in finished form for practical use.

The flat plate diaphragm pressure sensor indicated in FIG. 7 may be installed in, for example, a pipe for chemicals (not indicated in the drawing), in which case the fluororesin outer cylinder 70 together with the pressure-receiving portion of the pressure-sensing element 20 is immersed directly in a chemical solution and a pressure of the chemical solution drawn into the cylinder 70 is measured. In other words, a measured pressure of a chemical solution is transferred to the pressure receiving portion of the pressure-sensing element 20 and a change in capacitance caused by variations in a distance between the diaphragms provided in opposing relation is output as a detected signal from the pressure-sensing circuit 71. Thus, any part of the diaphragm pressure sensor which comes into contact with a solution whose pressure is measured may be produced from fluororesin. Further, if a metal outer cylinder is employed in place of the fluororesin outer cylinder 70, the parts of the sensor that come into contact with a solution can still be made of fluororesin simply by coating the metal cylinder with a fluororesin film.

What is claimed is:

1. A fluororesin thin film diaphragm pressure sensor, comprising:

a pressure-sensing element having a pressure-receiving part with a deposition electrode formed on each opposing surface of sapphire or alumina ceramic diaphragms which are provided in opposing relation to each other, and a welding portion on a portion of the surface of each of the diaphragms;

a fluororesin base for securing the pressure-sensing element at the welding portion of the pressure-sensing element; and said pressure-sensing element being coated with a fluororesin thin film having a cross linked structure, said pressure-sensing element and said fluororesin base being welding together via said fluororesin thin film having a cross linked structure;

whereby a measured pressure of a medium is transferred to said pressure-receiving part and variations in the distance between the deposition electrodes formed on the opposing faces of the opposing diaphragms respectively cause a change in capacitance.

2. The fluororesin thin film diaphragm pressure sensor as defined in claim 1, wherein said pressure-sensing element coated with said fluororesin thin film having a cross linked structure is secured to said fluororesin base by using a fluororesin welding agent by means of high temperature welding.

3. The fluororesin thin film diaphragm pressure sensor as defined in claim 1, wherein said pressure-sensing element is formed as a strip-shaped element.

4. The fluororesin thin film diaphragm pressure sensor as defined in claim 1, wherein said pressure-sensing element is formed as a flat plate element.

5. The fluororesin thin film diaphragm pressure sensor as defined in claim 1 provided with a fluororesin outer cylinder for guiding a fluid whose pressure is to be measured, to the pressure-receiving part of said pressure-sensing element.

* * * * *